United States Patent Office 3,216,851
Patented Nov. 9, 1965

3,216,851
COATING FOR COLUMBIUM
Sanford Baranow, Euclid, Ohio, and Ray C. Lever, Anchorage, Ky., assignors to the United States of America as represented by the United States Atomic Energy Commission
No Drawing. Filed Apr. 27, 1962, Ser. No. 191,407
3 Claims. (Cl. 117—114)

The present invention relates to coatings for columbium, and in particular to coatings which will provide a high degree of oxidation resistance at elevated temperatures.

Columbium is known to have a combination of properties which make it attractive for use in nuclear power applications. Not only does it have a high melting point (4380° F.), but also it is characterized by high strength, good thermal shock resistance, intermediate density, moderate thermal neutron cross section, and low thermal expansion. It also is easily fabricated and the metal and its oxides are essentially non-volatile. However, columbium is severely handicapped by its poor resistance to oxidation.

Notwithstanding a large effort extending over a period of several years, no columbium base material has been developed which provides oxidation resistance at temperatures in the range 2200° F. to 2500° F. for periods of the order of hundreds of hours. Efforts have therefore been made to provide a protective coating for columbium which will confer the desired high temperature oxidation resistance.

It is the object of this invention to provide a new and improved coating for columbium which will be resistant to oxidation at high temperatures for extended periods of time. This objective is obtained by hot dipping the columbium in a bath consisting of tin and aluminum to which may be added small amounts of chromium and titanium. In particular, the dip solution consists of the following metals in the proportions indicated below by weight percent:

Al _____ 5–30
Cr _____ 0–5
Ti _____ 0–½
Sn _____ Balance

The invention may be more fully understood by reference to the following specific examples of columbium coated by dipping in the dip solution disclosed herein. In each case, static oxidation tests demonstrated substantial oxidation resistance at 2200° F.

In practicing the invention the dip solution was prepared by melting the metals in a crucible and bringing the melt to the desired dip temperature under either a protective brazing flux or in an inert atmosphere without a flux. We have found an $Al_2O_3$ crucible is suitable for melting the solution.

The dip temperature may range from 1900° F. and the dipping time from 1 to 30 minutes. In any event, a combination of dipping time and temperature is selected which will provide a coating at least 2 mils in thickness. In this connection, experience has shown that coatings of ½ to 1½ mils are insufficient to give the desired oxidation resistance.

After dipping, the coated columbium article is given a diffusion treatment for about 1 hour at 1900° F. in a vacuum or in an inert atmosphere, such as an argon atmosphere.

The examples listed in the following Table I illustrate a variety of dip compositions within the scope of the present invention and show the life of each sample in static oxidation tests at 2200° F.

Table I

| Dip composition (w/o) | Dip temp. (° F.) | Dip time (min.) | Coating thickness (mils) | Life at 2200° F. (hours) |
|---|---|---|---|---|
| Sn–5Al | | | | *24 |
| Sn–10Al | 1,900 | 10 | 2 | 70 |
| Sn–10Al | 1,900 | 10 | 2 | 48 |
| Sn–10Al | 1,900 | 20 | 3 | 140 |
| Sn–10Al–1Cr | 1,900 | 10 | 3 | 190 |
| Sn–10Al–1Cr | 1,900 | 10 | 3 | 190 |
| Sn–8Al–2Cr | 1,900 | 5 | 2 | 74 |
| Sn–10Al–2Cr | 1,900 | 10 | 3½ | 140 |
| Sn–10Al–2Cr | 1,900 | 10 | 2½ | 70 |
| Sn–10Al–2Cr | 1,900 | 5 | 3 | 120 |
| Sn–10Al–1Cr–½Ti | 2,000 | 10 | 4 | 310 |
| Sn–10Al–1Cr–½Ti | 2,050 | 10 | 4 | 310 |
| Sn–10Al–1Cr–½Ti | 2,050 | 5 | 2½ | 215 |
| Sn–10Al–1Cr–½Ti | 2,050 | 7 | 3½ | 95 |
| Sn–10Al–2Cr–½Ti | 2,100 | 5 | 2½ | 190 |
| Sn–10Al–2Cr–½Ti | 2,100 | 10 | 2½ | 140 |
| Sn–10Al–2Cr–½Ti | 2,100 | 15 | 3½ | 360 |
| Sn–10Al–2Cr–½Ti | 2,100 | 20 | 2½ | 48 |
| Sn–10Al–2Cr–½Ti | 2,100 | 30 | 3 | 140 |
| Sn–10Al–4Cr | 2,100 | 5 | 2½ | 120 |
| Sn–15Al–2Cr | 1,900 | 5 | 3 | 70 |
| Sn–15Al–2Cr | 1,900 | 10 | 6½ | 190 |
| Sn–15Al–3Cr | 2,050 | 2 | 3½ | 70 |
| Sn–15Al–3Cr | 2,100 | 3 | 5 | 240 |
| Sn–20Al–3Cr | 2,000 | 1 | 2½ | 140 |
| Sn–20Al–3Cr | 2,030 | 2 | 5 | 120 |
| Sn–20Al–2Cr | 1,900 | 5 | 7 | 70 |
| Sn–20Al | 2,300 | 3 | 2½ | 72 |
| Sn–20Al–½Cr | 2,200 | 3 | 5 | 120 |

* At 2300° F.

The scientific basis for the success of the present coatings is not completely understood, and the approach to the problem has been largely empirical. However, it is deemed that the presence of tin in the coating may form relatively soft intermetallics between the coating constituents and the base metal, thereby reducing the tendency of the coating to crack.

In addition to the metals listed in the foregoing examples, other additives to the dip solution were attempted but without improvement in the oxidation resistance. These additives, and the results of their use on oxidation resistance are listed in the following Table II.

Table II

| Material: | Effect on life at 2220° F. |
|---|---|
| 1 w/o Y | No effect. |
| 0.1–0.3 w/o Si | Very deleterious. |
| 0.05 w/o B | Very deleterious. |
| 1 w/o Zn | Samples not tested (coating too thin). |
| ½–1 w/o Fe | Little or no effect. |
| 1–8% Mn | Little or no effect. |
| <1 w/o V | Little or no effect. |
| ½–2 w/o Ni | Little or no effect. |
| 5 w/o Ag | No effect. |

It will be seen that the present invention provides a method for protectively coating columbium against oxidation at high temperatures by dip coating in a solution comprising tin, and aluminum to which may be added minor amounts of chromium and/or titanium.

We claim:
1. The method of protectively coating columbium against oxidation at elevated temperatures that consists in dipping the columbium in a molten solution consisting of the following metals in weight percent:

Aluminum _____ 5–20
Tin _____ Balance for a period of 1–30 minutes, said molten solution being maintained at a temperature between about 1900° F. to 2300° F.; and removing the coated columbium.

2. The method of claim 1 wherein the dipping temperature is 2000° F. to 2100° F. and the dipping time is from 5 to 30 minutes.

3. The method of claim 2 wherein the coated columbium is subjected to a diffusion treatment in an inert atmosphere for about 1 hour at a temperature of about 1900° F.

References Cited by the Examiner

UNITED STATES PATENTS 3,181,936  5/65  Denny et al. _____ 29—194

OTHER REFERENCES

Nuclear Science Abstracts, vol. 15, No. 15996, June 30, 1961, SCNC–320 "High Temperature Oxidation Resistant Coatings for Tantalum Base Alloys," Progress Report, November 30, 1960.

JOSEPH B. SPENCER, *Primary Examiner.*

REUBEN EPSTEIN, *Examiner.*